United States Patent
Hood et al.

(10) Patent No.: US 8,974,332 B2
(45) Date of Patent: Mar. 10, 2015

(54) ADJUSTMENT DEVICE

(75) Inventors: William Gregory Hood, Charlotte, NC (US); Timothy Eugene Hornbuckle, Charlotte, NC (US); Thomas Scott Feller, Fort Mill, SC (US)

(73) Assignee: Patton's Medical, LLC, Charlotte, NC (US)

( * ) Notice: Subject to any disclaimer, the term of this patent is extended or adjusted under 35 U.S.C. 154(b) by 260 days.

(21) Appl. No.: 13/592,744

(22) Filed: Aug. 23, 2012

(65) Prior Publication Data

US 2014/0057747 A1 Feb. 27, 2014

(51) Int. Cl.
*F16H 7/12* (2006.01)
*F16H 7/20* (2006.01)

(52) U.S. Cl.
CPC ... *F16H 7/12* (2013.01); *F16H 7/20* (2013.01)
USPC .......................................... 474/110; 474/113

(58) Field of Classification Search
USPC ......... 474/101, 109, 110, 111, 112, 113, 115, 474/140, 114
See application file for complete search history.

(56) References Cited

U.S. PATENT DOCUMENTS

| | | | | |
|---|---|---|---|---|
| 3,922,927 | A | * | 12/1975 | Shiki et al. .................... 474/113 |
| 4,249,425 | A | * | 2/1981 | Watson ......................... 474/110 |
| 4,571,221 | A | * | 2/1986 | Isobe et al. .................... 474/101 |
| 4,573,952 | A | * | 3/1986 | Schulze ........................ 474/110 |
| 4,583,961 | A | * | 4/1986 | Kawasawa et al. ............ 474/113 |
| 4,917,529 | A | * | 4/1990 | Hishida ......................... 403/259 |
| 6,240,893 | B1 | * | 6/2001 | Hankins et al. ............ 123/195 A |
| 6,478,701 | B1 | * | 11/2002 | Yasuhara et al. ................. 474/12 |
| 2002/0039946 | A1 | * | 4/2002 | Serkh ............................. 474/136 |
| 2003/0017895 | A1 | * | 1/2003 | Baker ............................. 474/114 |
| 2003/0176250 | A1 | * | 9/2003 | Austin et al. ................... 474/134 |

* cited by examiner

*Primary Examiner* — William E Dondero
*Assistant Examiner* — Robert T Reese
(74) *Attorney, Agent, or Firm* — Clements Bernard PLLC; Seth L. Hudson

(57) ABSTRACT

The present invention provides methods and systems for an adjustment device for allowing the expeditious adjustment of drive belts that includes a frame having at least one channel, a tab extending substantially perpendicularly from the longitudinal axis of the frame, and a boss rotationally disposed on the frame. A support member is disposed adjacent the frame and includes a bore for receiving an adjustment member having a first end and a second end, and the second end of the adjustment member is disposed in close proximity to the tab of the frame.

14 Claims, 5 Drawing Sheets

ADJUSTMENT DEVICE

FIELD OF THE INVENTION

The present invention relates generally to an adjustment device, and more particularly relates to an adjustment device coupled to a compressed air device that is compact and saves valuable space during operation and allows for the accurate, efficient, and expeditious adjustment of a drive belt.

BACKGROUND OF THE INVENTION

The adjustment of belts on a piece of machinery can be a time consuming operation. This is especially so on a piece of equipment that is vital to the operation of a system or a business. For example, when the piece of equipment is supplying compressed air to a hospital, the hospital needs the compressed air to be pumped throughout the hospital continuously. The compressed air is pumped throughout the hospital by compressors that utilize drive belts. Because of the nature of the drive belts, they need to be changed periodically and this changing of the drive belts must be accurate, efficient, and expeditious. The present invention provides a device that is compact and allows the accurate, efficient, and expeditious adjustment of drive belts.

BRIEF SUMMARY OF THE INVENTION

According to an embodiment of the present invention, a device for expeditiously tensioning a drive belt is claimed that includes a frame having at least one channel and a boss rotationally disposed on the frame. A support member is disposed adjacent the frame for receiving an adjustment member having a first end and a second end, and the second end of the adjustment member is disposed in close proximity to the frame. The adjustment member engages the frame for moving the frame in substantially the horizontal direction.

According to another embodiment of the present invention, the device for expeditiously tensioning a drive belt that includes two, spaced-apart longitudinally oriented channels.

According to yet another embodiment of the present invention, the device for expeditiously tensioning a drive belt that includes an elongate portion of the frame that extends upward from the longitudinal axis of the frame and includes the boss.

According to yet another embodiment of the present invention, the device for expeditiously adjusting a drive belt includes a base that is generally trapezoidal in shape having a planar top portion for receiving the motor.

According to yet another embodiment of the present invention, the device for expeditiously tensioning a drive belt that includes a support member that has a threaded bore for receiving a correspondingly threaded adjustment member that rotates within the threaded bore.

According to yet another embodiment of the present invention, the device for expeditiously tensioning a drive belt that includes a base and at least one belt inserted through the channel of the at least one channel for engaging the base to the frame.

According to yet another embodiment of the present invention, the device for expeditiously tensioning a drive belt that includes a stop positioned on the first end of the adjustment member for preventing the first end from proceeding through the support member.

According to yet another embodiment of the present invention, a device for producing compressed air that expeditiously allows for the adjustment of a drive belt that includes a base, a motor, at least one compressor mounted to the base, a frame having at least one channel and a boss rotationally disposed on the frame. The support member is disposed adjacent the frame and includes a bore for receiving an adjustment member having a first end and a second end, and the second end of the adjustment member is disposed in close proximity to the frame.

According to yet another embodiment of the present invention, a device for producing compressed air that expeditiously allows for the adjustment of a drive belt that includes two spaced-apart channels oriented along the longitudinal axis of the frame and designed to receive mounting bolts and the two spaced-apart channels may be movable with respect to the mounting bolts.

According to yet another embodiment of the present invention, a device for producing compressed air that expeditiously allows for the adjustment of a drive belt that includes an adjustment wheel engaged to the boss of the frame, whereby the adjustment wheel translates along with the translation of the frame.

According to yet another embodiment of the present invention, a device for producing compressed air that expeditiously allows for the adjustment of a drive belt that includes a threaded bore disposed within the support member for receiving a correspondingly threaded adjustment member, the adjustment member rotates within the threaded bore allowing the adjustment member to translate within the horizontal direction.

According to yet another embodiment of the present invention, a device for producing compressed air that expeditiously allows for the adjustment of a drive belt that includes a base that is generally trapezoidal in shape and having a planar top portion for receiving the motor.

According to yet another embodiment of the present invention, a device for producing compressed air that expeditiously allows for the adjustment of a drive belt that includes a tab that extends outwardly from the planar surface of the frame.

According to yet another embodiment of the present invention, a device for producing compressed air that expeditiously allows for the adjustment of a drive belt that includes a base, a motor disposed on the base having a drive wheel, a first compressor engaged to the base and having a slave wheel, a second compressor engaged to the base and having a slave wheel, and a frame having at least one channel, a tab extending substantially perpendicularly from the longitudinal axis of the frame, a boss rotationally disposed on the frame, and an adjustment wheel engaged to the boss. A support member is disposed adjacent the frame and includes a bore for receiving an adjustment member having a first end and a second end, and the second end of the adjustment member is disposed in close proximity to the tab of the frame. A belt is positioned on the drive wheel, the slave wheel of the first compressor, the slave wheel of the second compressor, and the adjustment wheel, wherein the frame and adjustment wheel translate, allowing for the adjustment of the belt.

According to yet another embodiment of the present invention, a device for producing compressed air that allows for the expeditious adjustment of a drive belt that includes a support member that has a centrally located threaded bore for receiving a correspondingly threaded adjustment member that rotates within the threaded bore.

According to yet another embodiment of the present invention, a device for producing compressed air that allows for the expeditious adjustment of a drive belt wherein the base has a first side, a second side, a third side, and a fourth side, wherein the motor is positioned on the third side of the base.

BRIEF DESCRIPTION OF THE DRAWINGS

The present invention is illustrated and described herein with reference to the various drawings, in which like refer

DETAILED DESCRIPTION OF THE INVENTION

Figure 1:
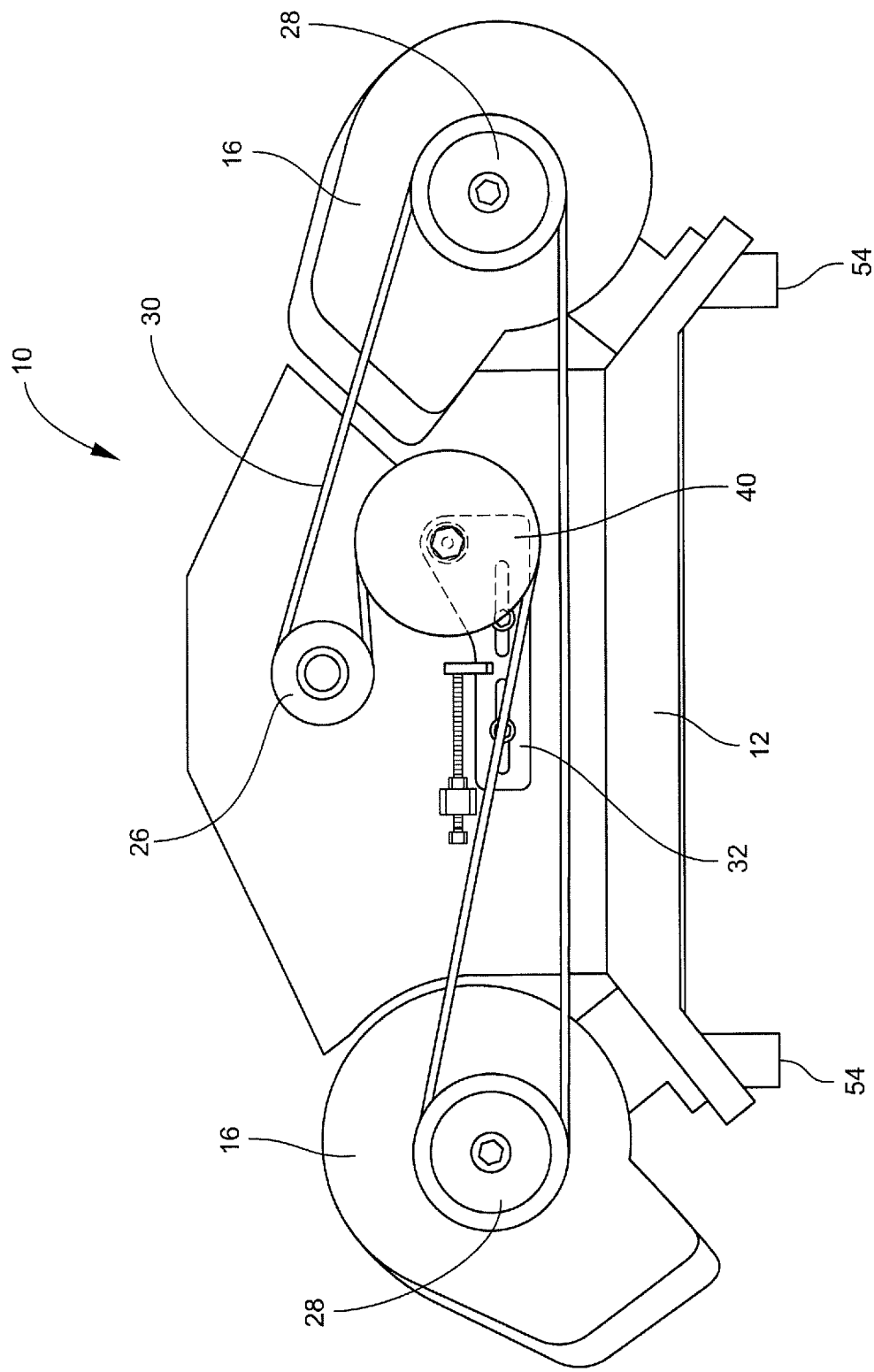
- FIG. 1 is a front side view of the compressed air device.
Figure 2:
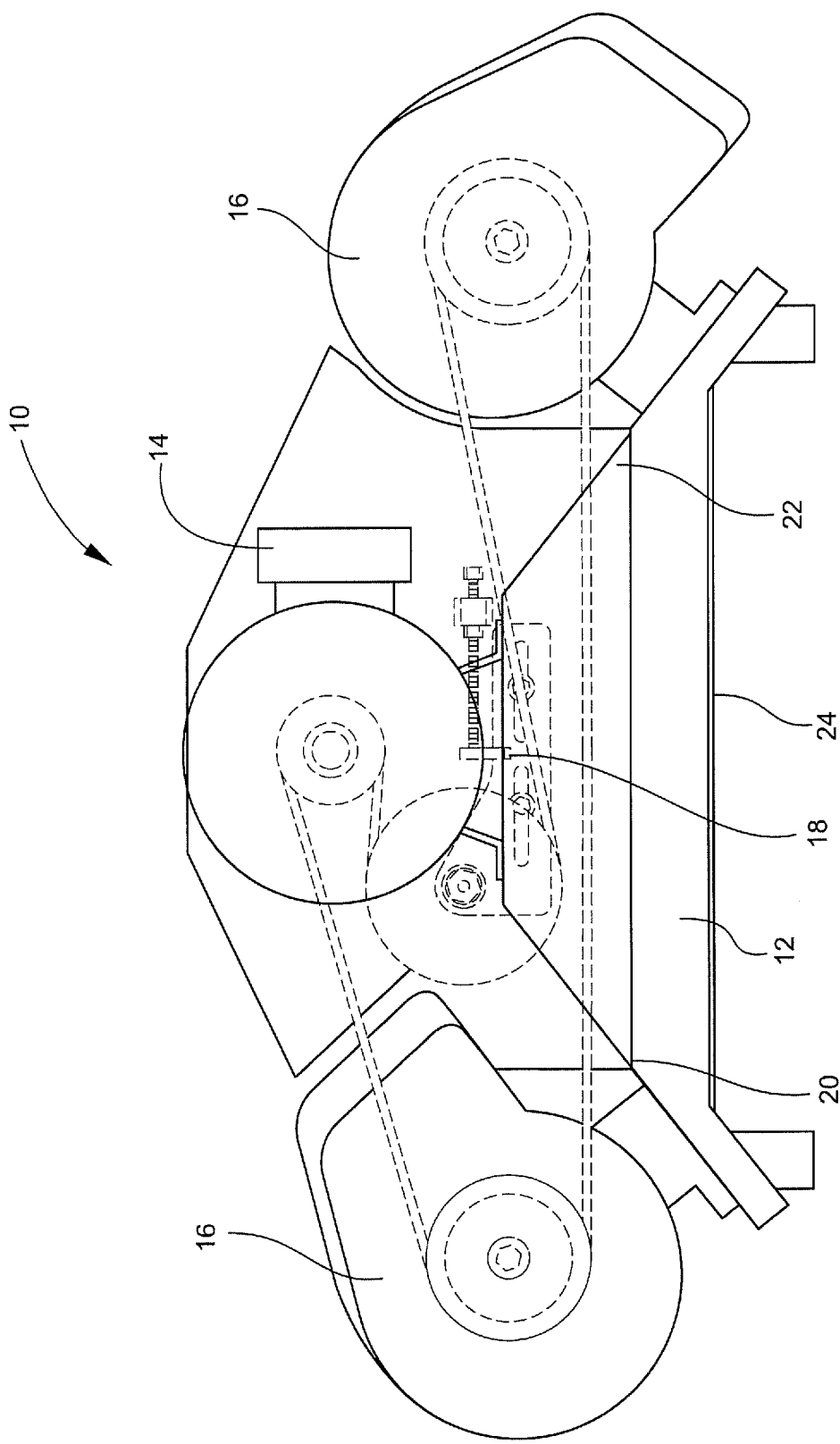
FIG. 2 is a back side view of the compressed air device.

Referring now specifically to the drawings, an improved compressed air device is illustrated in FIG. 1 and is shown generally at reference numeral 10. The device 10 includes a base 12, a motor 14, and at least one compressor 16, as shown in FIGS. 1-6. Preferably, the device 10 will include two compressors 16 that are mounted to the base 12. The base 12 may have a plurality of sides. As illustrated in FIG. 2, the base has a first side 18, a second side 20, a third side 22, and a fourth side 24. Each side (18, 20, 22, 24) has a top portion and a bottom portion. The top portion of the sides (18, 20, 22, 24) is the exposed portion or the portion that is more easily accessible to a user when the device 10 is in the upright position. By way of example, the motor 14 is positioned on the top portion of the first side 18, as illustrated in FIG. 2 and the compressors 16 are positioned on the top portion of the second side 20 and third side 22. The bottom portion of the sides (18, 20, 22, 24) is the portion opposite the top portion.

The base 12 may have any form, but as illustrated in FIG. 1, the base has a substantially trapezoidal form. The term substantially trapezoidal form means that the base includes four primary sides that may be adjacent to one another. In other words, the sides may intersect. The term substantially trapezoidal form may also mean that the four primary sides do not intersect, but the planes of the sides intersect at a point or are an asymptote.

The sides (18, 20, 22, 24) of the base 12 are in a spaced apart relationship forming a void 24 within. As illustrated in FIG. 2, the motor 14 is positioned on the top portion of the first side 18. The motor is fastened to the top portion of the first side 18 by a bolt, screw, weld, or the like.

The second side 20 of the base 12 includes at least one pair of slots. The third side 22 of the base 12 includes at least one pair of slots. Preferably, the second side 20 and third side 22 of the base 12 includes two pairs of slots disposed on each side (20, 22). Each compressor 16 preferably contains a fastener that extends from the bottom of the compressor 16. The fastener may be a belt, screw, threaded extension or the like. A threaded extension may be utilized as a fastener and extends from the compressor 16 and is inserted into the slots. By way of example only, the compressor 16 includes four (4) threaded extensions or bolts that extend downward and are inserted into the slots. Each bolt contains a threaded end for receiving a correspondingly threaded nut. The threaded extension also receives a correspondingly threaded nut. The compressors 16 may be stationary or slidingly engaged to the top portion of the second side 20 and the top portion of the third side 22 of the base 12.

Figure 3:
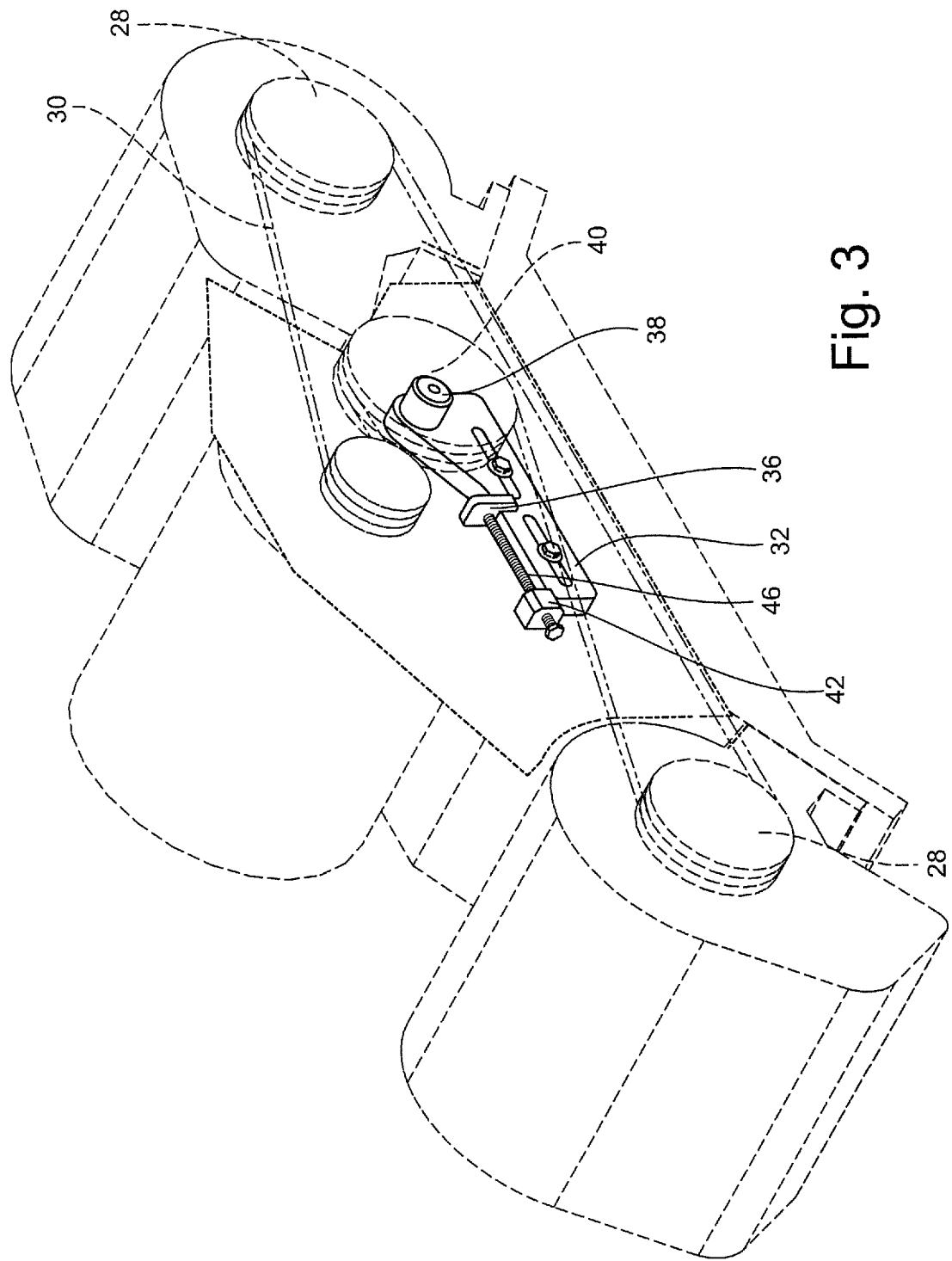
FIG. 3 is a perspective view of the compressed air device.

As illustrated in FIGS. 1-3, the motor 14 includes a drive wheel 26 and each compressor 16 includes a slave wheel 28. A belt 30 is positioned on the drive wheel 26 and the slave wheel 28, allowing the motor 14 to supply rotational energy to the compressor 16 for operating the compressor 16. For the device 10 to run efficiently, economically, and smoothly, the belt 30 must contain the optimum amount of tension. Therefore, the belt 30 must be able to be adjusted quickly and efficiently.

Figure 4:
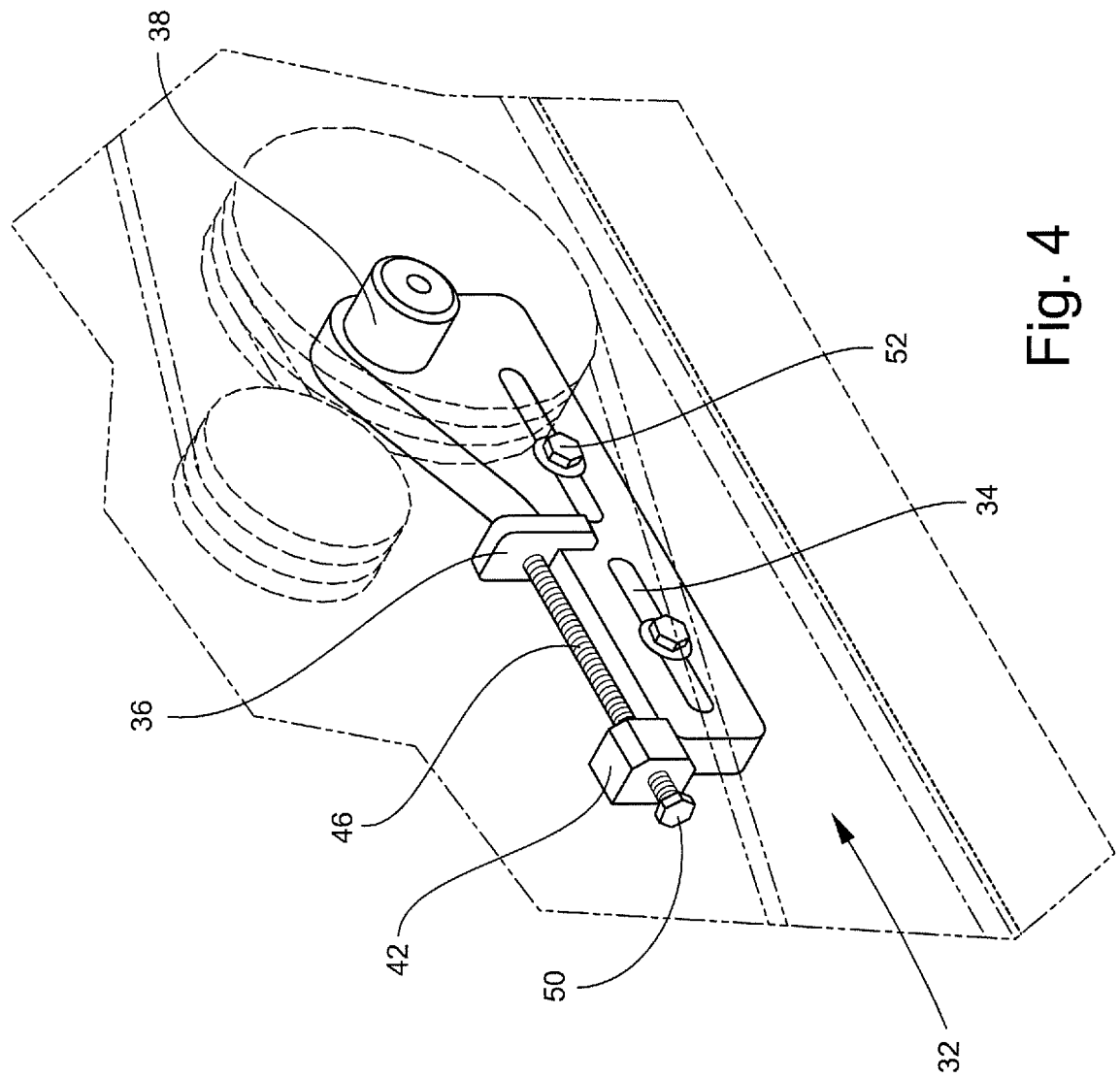
FIG. 4 is a perspective view of the frame, support member, adjustment member, and adjustment wheel.
Figure 5:
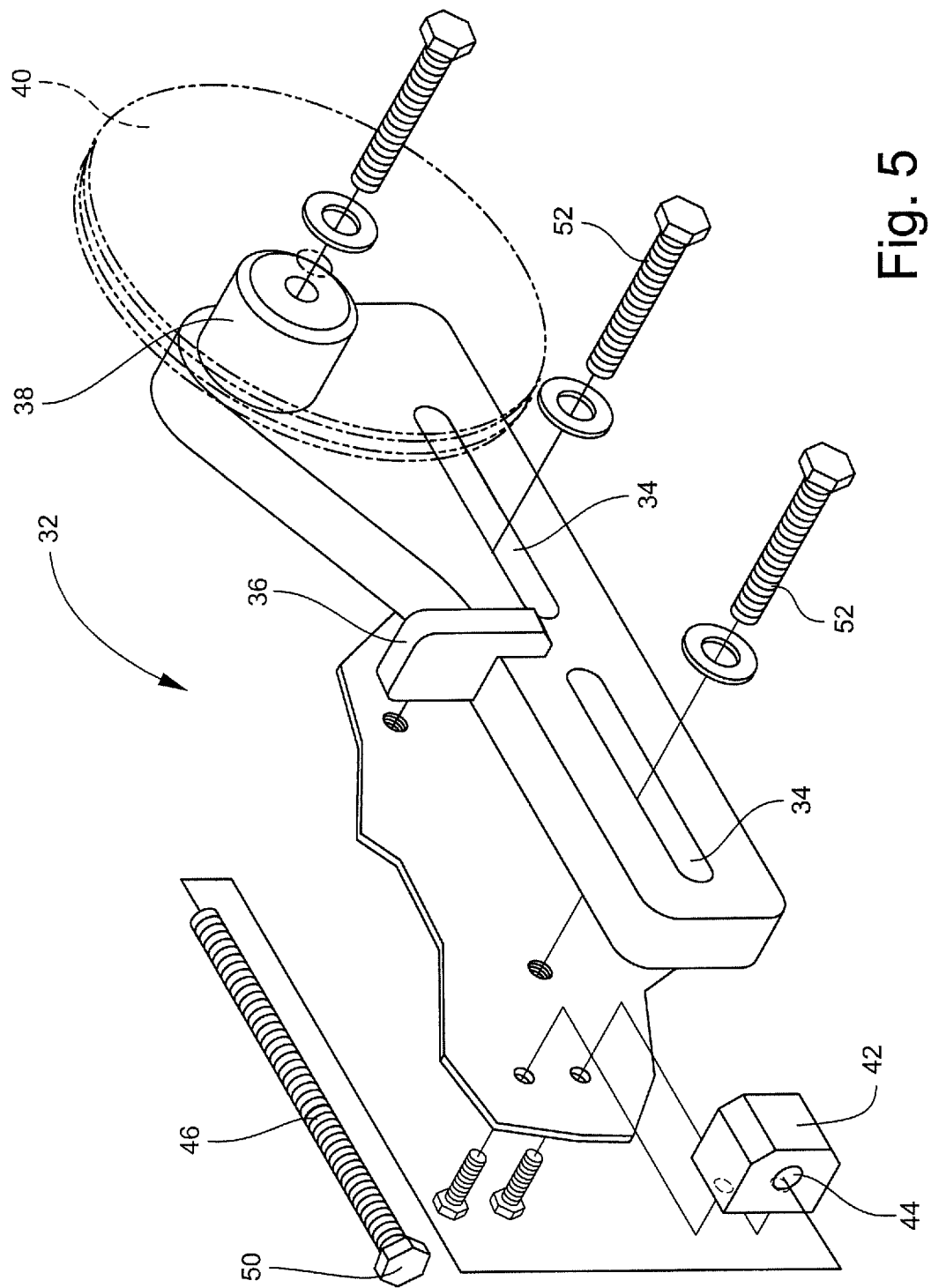
FIG. 5 is an exploded view of the frame, support member, adjustment member, and adjustment wheel.

A frame 32 is positioned on the base 12 and the fame 32 has a top side, a bottom side, a front side, and a back side. The frame 32, as illustrated in FIGS. 4 and 5, includes at least one channel 34, a tab 36, and a boss 38. The at least one channel 34 is horizontally oriented and extends from the front side to the back side of the frame. As illustrated, the frame 32 contains two channels 34 that are in a spaced-apart relationship and oriented in the horizontal direction. The tab 36 is oriented perpendicular to the planar direction of the frame 32 and extends from the top side of the frame 32. The tab 36 has a front portion and a back portion, wherein the tab 36 may have a width greater than the width of the frame 32. The tab 36 may be disposed on any portion of the frame 32, but as illustrated, the tab 36 is substantially centrally located upon the top portion of the frame 32.

The boss 38 is rotationally engaged to the front side of the frame 32. The frame 32 includes an elongate portion that extends upward from the longitudinal axis on one end of the frame 32. The boss 38 is positioned on the upper portion of the elongate portion, thus creating more space between the boss 38 and the at least one channel 34. The boss 38 is rotationally engaged to the frame 32, meaning the boss 38 may rotated independently of the frame 32. An adjustment wheel 40 is engaged to the boss 38.

A support member 42 is positioned adjacent the frame 32. A centrally located bore 44 is positioned within the support member 42 and proceeds from a first side to a second side of the support member 42. The bore 44 is positioned along the longitudinal axis and parallel to the longitudinal axis of the frame 32. An adjustment member 46 is received within the bore 44. Preferably, the bore 44 is threaded and the adjustment member 46 is correspondingly threaded for allowing the adjustment member 46 to rotate within the bore 44, causing the adjustment member 46 to translate in the horizontal direction. As illustrated in FIGS. 4 and 5, the adjustment member is an elongated bolt.

The support member 42 also contains at least two retaining bores on the rear of the support member 42 for receiving correspondingly threaded bolts for engaging the support member 42 to the base 12. The adjustment member 46 has a first end and a second end, whereby the second end may also contain a head 50 that has two primary functions. First, the head 50 serves as a stop and prevents the adjustment member 46 for proceeding further than a predetermined distance through the support member 42. Second, the head 50 allows a tool, such as a wrench or socket, to engage the adjustment member 46 and rotate the adjustment member 46. The adjustment member 46 is designed to move or adjust the frame 32. The first end of the adjustment member 46 is located in close proximity to the tab 36 so that when the adjustment member 46 translates towards the frame 32, the first end of the adjustment member 46 engages the tab 36 and pushes against the tab 36, causing the frame 32 to move.

As illustrated in FIG. 5, frame bolts 52 extend through the channels 34 for engaging the frame 32 to the base 12. The frame bolts 52 also allow the frame 32 to translate in the horizontal direction. When the frame bolts 52 are loosened, the frame 32 is allowed to slide in the horizontal direction along the length of the channels 34. When the frame bolts 52 are tightened, the frame 32 is stationary and does not move.

A mounting foot 54 may be engaged to the device 10 for selectively securing the device 10 to a structure. The mounting foot 54 may be selectively secured to the device 10 by fasteners, such as a bolt, and the mounting foot 54 may be selectively secured to the structure by a fastener, such as a bolt. As illustrated, the mounting foot 54 may be selectively secured to the second side 20 or third side 22 of the base 12.

During use, the belt 30 is engaged to the drive wheel 26, the slave wheel 28 of each compressor 16, and the adjustment wheel 40. The motor 14 provides power and rotates the drive wheel 26, causing the belt 30 to move. As the belt 30 moves, the slave wheel 28 of each compressor 16 and the adjustment wheel 40 rotate. The slave wheel 28 of each compressor 16 is positioned in close proximity to the second side 20 and third side 22 of the base 12. The drive wheel 26 and adjustment wheel 40 are generally centrally located between the two slave wheels 28. In order to tighten the belt 30, the user loosens the frame bolts 52 and then engages the adjustment member 46. In the embodiments illustrated herein, the adjustment member 46 is rotated in the clock-wise direction, meaning the adjustment member 46 translates towards the frame 32 and engages the tab 36. As the adjustment member 46 continues to be rotated, it pushes the tab 36 and frame 32 along the longitudinal axis, causing the belt 30 to tension. Once the belt 30 has reached the desired level of tension, the frame bolts 52 are secured to the base 12, preventing movement of the frame 32 and keeping the belt 30 properly tensioned.

Additionally, a protection shield may be positioned over the drive wheel 26, slave wheel 28, belt 30, and adjustment wheel 40 to protect the safety of user of the device from getting limbs, hair, or clothing tangled with the wheels (26, 28, 40) and belts 30. The protection shield also reduces the amount of dirt or debris that enters the wheels (26, 28, 40) and belts 30.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A device for producing compressed air that expeditiously allows for the adjustment of a drive belt, comprising:
    a base having a first side with a top portion and a bottom portion, a second side with a top portion and a bottom portion, a third side with a top portion and a bottom portion, and a fourth side with a top portion and a bottom portion, wherein the first side, second side, third side, and fourth side collectively form a void therein;
    a motor positioned on the top portion of the first side;
    at least one compressor mounted to top portion of the second side or the top portion of the third side;
    a frame having at least one channel and a boss rotationally disposed on the frame; and
    a support member disposed adjacent the frame and including a bore for receiving an adjustment member having a first end and a second end, and the second end of the adjustment member is disposed in close proximity to the frame.

2. The device of claim 1, further comprising two spaced-apart channels oriented along the longitudinal axis of the frame and designed to receive mounting bolts and the two spaced-apart channels may be movable with respect to the mounting bolts.

3. The device of claim 1, further comprising an adjustment wheel engaged to the boss of the frame, whereby the adjustment wheel translates along with the translation of the frame.

4. The device of claim 1, further comprising a threaded bore disposed within the support member for receiving a correspondingly threaded adjustment member, the adjustment member rotates within the threaded bore allowing the adjustment member to translate within the horizontal direction.

5. The device of claim 1, wherein the base is generally trapezoidal in shape having a planar top portion for receiving the motor.

6. The device of claim 1, wherein a tab extends outwardly from the planar surface of the frame.

7. A device for producing compressed air that allows for the expeditious adjustment of a drive belt, comprising:
    a base having a first side with a top portion and a bottom portion, a second side with a top portion and a bottom portion, a third side with a top portion and a bottom portion, and a fourth side with a top portion and a bottom portion;
    a motor positioned on the top portion of the first side having a drive wheel;
    a first compressor engaged to the top side of the second side and having a slave wheel;
    a second compressor engaged to the top side of the third side and having a slave wheel;
    a frame having at least one channel, a tab extending substantially perpendicularly from the longitudinal axis of the frame, a boss rotationally disposed on the frame, and an adjustment wheel engaged to the boss; and
    a support member disposed adjacent the frame and including a bore for receiving an adjustment member having a first end and a second end, and the second end of the adjustment member is disposed in close proximity to the tab of the frame,
    wherein a belt is positioned on the drive wheel, the slave wheel of the first compressor, the slave wheel of the second compressor, and the adjustment wheel,
    wherein the frame and adjustment wheel translate, allowing for the adjustment of the belt.

8. The device of claim 7, wherein the support member has a centrally located threaded bore for receiving a correspondingly threaded adjustment member that rotates within the threaded bore.

9. The device of claim 7, wherein the base has a first side, a second side, a third side, and a fourth side, wherein the motor is positioned on the third side of the base.

10. The device of claim 7, further comprising two channels that are in a spaced-apart relationship and aligned along the longitudinal axis of the frame.

11. The device of claim 7, wherein the adjustment member is a threaded bolt that includes a head for preventing translational movement further from a predetermined distance and for rotating the adjustment member.

12. The device of claim 7, further comprising an elongate portion of the frame that extends upward from the longitudinal axis of the frame and includes the boss.

13. The device of claim 7, further comprising at least one bolt inserted through the channel of the at least one channel for engaging the base to the frame.

14. The device of claim 7, wherein the adjustment wheel is rotationally engaged to the boss with a threaded bolt.

* * * * *